United States Patent [19]

Ohmae et al.

[11] 4,287,405

[45] Sep. 1, 1981

[54] PROCESS AND APPARATUS FOR EXHAUSTING FUMES PRODUCED BY ARC WELDING

[75] Inventors: Takashi Ohmae; Yasuhiro Fukaya; Yasuyuki Yoshida; Tamotu Oka; Masahiko Sato, all of Hiroshima; Masazumi Nagareda, Saka, all of Japan

[73] Assignee: Mitsubishi Jukogyo Kabushiki Kaisha, Tokyo, Japan

[21] Appl. No.: 81,260

[22] Filed: Oct. 2, 1979

[51] Int. Cl.[3] .................................... B23K 9/32

[52] U.S. Cl. .................................... 219/136; 15/319; 98/115 R; 180/167; 219/137 R; 219/137.41

[58] Field of Search ............ 219/136, 137 R, 137.41; 15/319; 98/115 R; 180/167

[56] References Cited

U.S. PATENT DOCUMENTS

| | | | |
|---|---|---|---|
| 2,772,625 | 12/1956 | Clark | 219/136 X |
| 4,058,299 | 11/1977 | Linduist | 98/115 R X |

*Primary Examiner*—E. A. Goldberg

*Attorney, Agent, or Firm*—Wenderoth, Lind & Ponack

[57] ABSTRACT

During arc welding, optical radiation emitted from an arc is detected by means of a photoelectric device, and an electric detection signal from the photoelectric device is used for controlling the travel of a suction hood along a weld line so that the weld fumes may be exhausted through the suction hood and to insure that the weld metal zone is always covered by the suction hood.

10 Claims, 12 Drawing Figures

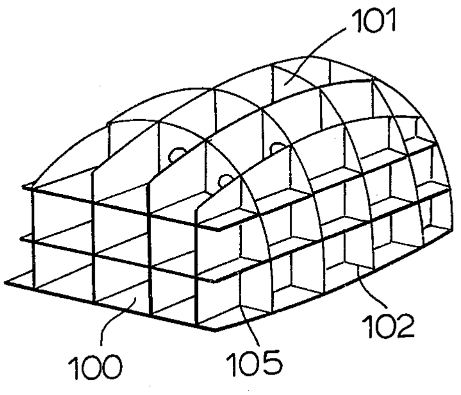
FIG. 1
FIG. 2
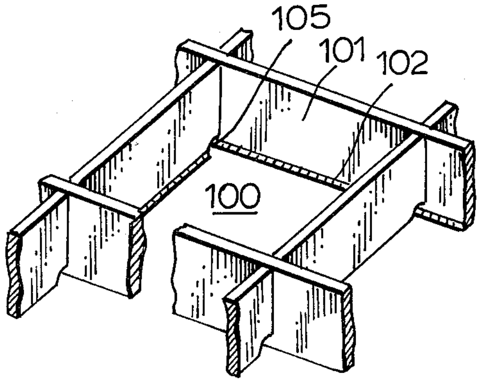
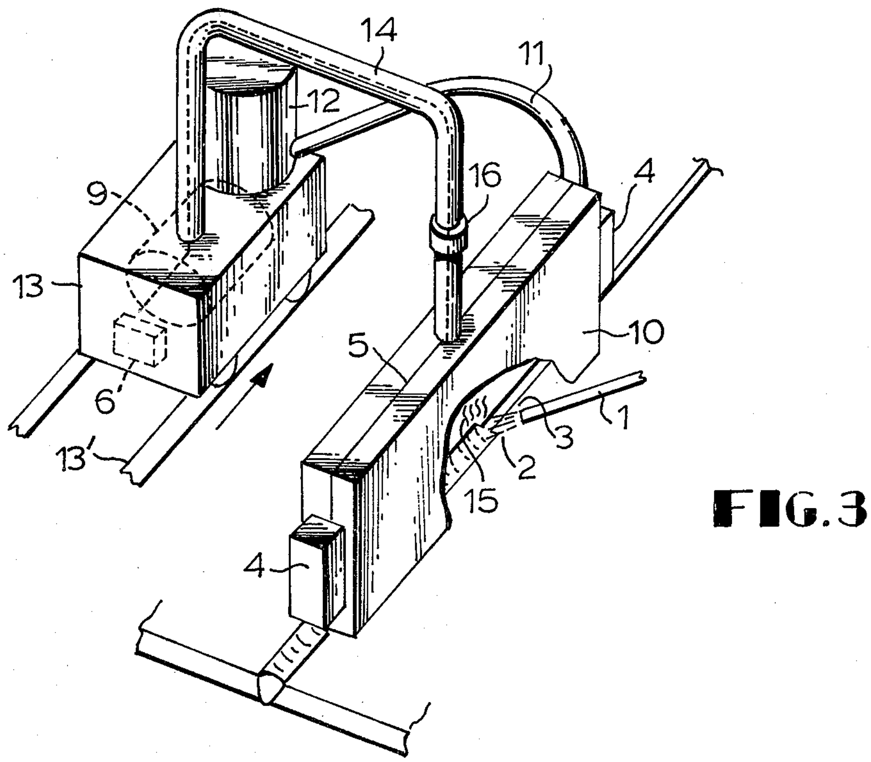
FIG. 3

PROCESS AND APPARATUS FOR EXHAUSTING FUMES PRODUCED BY ARC WELDING

BACKGROUND OF THE INVENTION

The present invention relates in general to improvements in a process and apparatus for exhausting fumes produced by arc welding.

Generally, during welding, there is an emission from molten welding flux, filler metal, base metal, etc. held at a high temperature, of micro-fine particles of iron, manganese, silicon and other harmful metal oxides (fumes in a narrow sense), as well as the emission of harmful gases such as nitrogen oxides gas, carbon monoxide gas or the like and other gases such as carbon dioxide gas (hereinafter these are generally called "weld fumes"). Therefore, to preserve the welder's health itis desirable to remove these weld fumes caused by the welding, and in the case of welding within a narrow compartment, the necessity of the removal of fumes is especially large.

Heretofore, as a means for exhausting weld fumes there are known apparatus in which a fume suction hood is provided in association with a welding protector which was held in the welder's hands during use and connected directly or via a connector to the latter and the hood was connected through a flexible tube to a bag filter provided separately, known apparatus in which a fume suction hood having various shapes designed so as to conform to configurations of bodies to be welded is disposed at a predetermined position such that the hood may surround a welding zone and the hood is connected to a fume processor (either of a fixed type or of a movable type) such as a bag filter or the like provided separately through one or more flexible tubes, and known apparatus modified from the second apparatus above in which the suction hood is mounted on an electrode holder or assembled integrally therewith.

However, the above-described respective weld fume exhausting means in the prior art have the following problems. The first apparatus has a problem in that since a suction hood is provided in association with a welding protector, a burden on a welder is increased; while the second apparatus can mitigate the increase of the burden on the welder because the suction hood is disposed so as to surround the welding zone, the second type of apparatus provided with a small suction hood and a fixed type fume processor has a problem in that each time the welding position is displaced, both the suction hood and the fume processing machine must be displaced; an apparatus provided with a large suction hood and a movable type fume processor has a problem in that a lot of labor is required for the reconnection of the flexible tubes resulting in a poor workability, and the apparatus is inevitably large-sized and hence cannot be used within a narrow compartment.

Furthermore, the third apparatus has a problem in that since the weight of the electrode holder is increased, the apparatus cannot be used in manual welding, and even if such a welding torch associated with a suction hood were to be mounted in a fully automatic welding machine, the apparatus is large-sized and thus could not be used within a narrow compartment.

SUMMARY OF THE INVENTION

Therefore, it is a principal object of the present invention to resolve the aforementioned problems associated with the known prior art apparatus for exhausting weld fumes.

According to one feature of the present invention, there is provided a process and an apparatus for exhausting weld fumes in which the position control of a suction hood for the weld fumes can be effected automatically in response to the detection of optical radiation emitted from a welding zone.

According to another feature of the present invention, there is provided a process for exhausting weld fumes which consists of the steps of detecting an optical radiation emitted from an arc in a weld metal zone, and effecting the position control of a suction hood for the weld fumes covering said weld metal zone in response to an electric detection signal that is related to the intensity of illumination of said optical radiation as detected.

According to still another feature of the present invention, there is provided an apparatus for exhausting weld fumes comprising a truck movable in the direction of the progress of the welding, truck driving means for making said truck travel substantially in parallel with a welding line, a suction hood for weld fumes supported from said truck, a fume processor connected to said suction hood, photoelectric means mounted on said suction hood for detecting optical radiation emitted from a weld metal zone during arc welding, and truck start-stop control means responsive to an electric detection signal derived from said photoelectric means for controlling said truck driving means.

According to yet another feature of the present invention, there is provided a further improved apparatus for exhausting weld fumes that is especially applicable to fillet welding, and which comprises a truck adapted to travel on a floor plate of base metal consisting of a magnetic material in a fillet weld metal zone along an intersection between said floor plate and a wall plate of the same base metal, a suction hood for weld fumes that is formed integrally with said truck for introducing the weld fumes into a weld fume processor mounted on said truck, magnet rollers rotatably mounted on said suction hood and adapted to be guided along the surface of said wall plate as being attracted thereby, truck driving means for driving said truck jointly with said suction hood to travel via the rotational driving of said magnet rollers, photoelectric means mounted on said suction hood for detecting optical radiation emitted from said fillet weld metal zone during arc welding, and truck start-stop control means responsive to an electric detection signal derived from said photoelectric means for controlling said truck driving means.

BRIEF DESCRIPTION OF THE DRAWINGS

FIGS. 1 and 2 show a weld structure consisting of narrow compartments as seen in a ship, FIG. 1 being an overall perspective view, and FIG. 2 being an enlarged partial perspective view of the same structure;

FIGS. 3 to 5 show an apparatus for exhausting weld fumes according to one preferred embodiment of the present invention, FIG. 3 being a perspective view showing the apparatus partly cut away as used in butt welding, FIG. 4 being a diagrammatic illustration of an operation principle of the same apparatus, and FIG. 5 being a perspective view showing the same apparatus as used in fillet welding.

DESCRIPTION OF PREFERRED EMBODIMENTS

Figure 4:
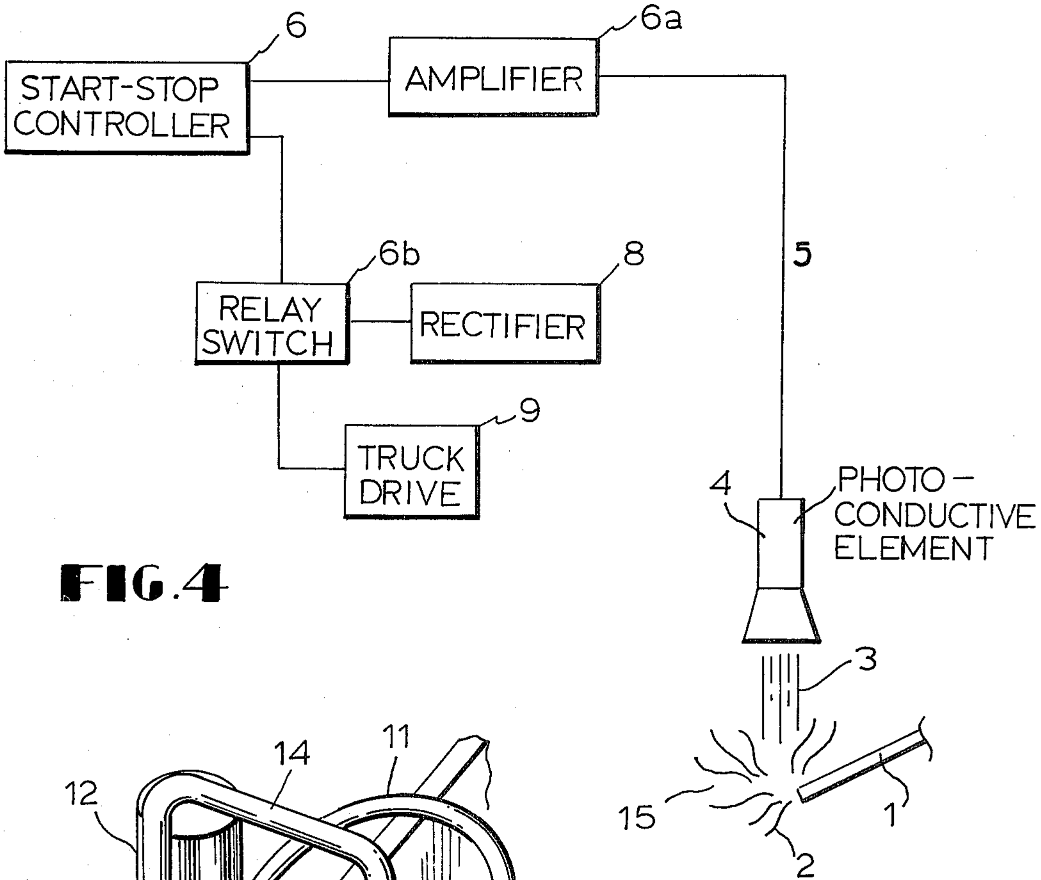

The present invention is preferably embodied in the following ways:

As illustrated in FIGS. 1 and 2, ships are provided with many narrow compartments which are constructed by welding fillet portions along intersections between a floor plate 100 and wall plates 101 of weld base metal such as steel. Structures provided with narrow compartments similar to those shown in FIGS. 1 and 2 are also seen in many architectural constructions having special configurations such as, for example, marine constructions, chemical installations and other industrial machines. The present invention is preferably utilized for welding works within such narrow compartments.

Now a process and an apparatus for exhausting weld fumes according to one preferred embodiment of the present invention will be described with reference to the accompanying drawings. As shown in FIG. 3, a truck 13 having wheels is disposed so as to be movable in the direction of progress of butt welding along guide means such as rails 13' or the like laid on a floor plate in parallel with a weld line.

Within this truck 13 is equipped a truck driving device 9 associated with a D. C. motor, so that the truck 13 can be moved along the rails 13' by actuating the truck driving device 9.

In addition, a suction hood 10 for weld fumes is fixedly supported from the truck 13 via an inverse U-shaped connecting pipe 14 made of steel; at the bottom of this suction hood 10 is formed an elongated aperture along the direction of progress of welding so as to cover the weld metal zone from the above, and at the top of the suction hood 10 is connected a suction tube 11 for weld fumes.

This tube 11 is connected to a fume processor 12 located on the truck 13, so that fumes produced by welding are led through the hood 10 and the tube 11 into the fume processor 12, where the fumes are subjected to filtering and absorbing operations so as to be cleaned, and then are exhausted to the atmosphere. It is to be noted that the fume processor 12 could be disposed so as to be contained within the truck 13.

During butt welding, between an electrode 1 and a base metal to be welded a welding arc 2 and weld fumes 3 are produced, and for the purpose of detecting optical radiation 3 emitted by the welding arc 2 at the weld metal zone, photo-conductive elements 4 serving as photoelectric detectors are disposed on the front and rear end surfaces, respectively, of the suction hood 10.

The respective photo-conductive elements (hereinafter abbreviated as P. C. E.) are disposed with their light receiving surfaces directed towards the bottom aperture of the suction hood or in the direction somewhat inclined inwardly from the first said direction, and, as shown in FIGS. 3 and 4, these P. C. E's. 4 are connected via cables 5 to a truck start-stop controller 6. This controller 6 is associated with an amplifier 6*a* and a relay switch 6*b* as shown in FIG. 4.

In addition, the relay switch 6*b* is connected to a rectifier 8 for converting an A. C. to a D. C., and in response to detection signals received from the P. E. E's. 4, the controller 6 allows D. C. power to be supplied from the rectifier 8 through the relay switch 6*b* to the truck driving device 9 to achieve drive control, whereby the truck 13 can be controlled so as to be started in the forward or backward direction or to be stopped.

The controller 6 is provided with a travelling speed control device which is not shown, and the truck driving device 9 can thereby be preset at a predetermined speed that is slightly greater than the speed of progress of the welding. Reference numeral 15 designates a weld metal zone associated with a tip end of an electrode where weld fumes are produced, and numeral 16 designates a connecting pipe adjusting device for adjusting the distance between the base metal to be welded and the suction hood 10. The connecting pipe 14 also serves as a handle upon carrying the subject apparatus.

Since the apparatus for exhausting weld fumes according to the present invention is constructed as described above, in order to exhaust weld fumes produced during welding, at first the truck 13 is placed on the rails 13' as shown in FIG. 3. Then the suction hood 10 is so set that it may cover the weld metal zone from above in a spaced relation thereto and its bottom aperture may be directed to the weld metal zone 15 where weld fumes are produced.

Subsequently, when the welding is commenced, a welding arc 2 between the electrode 1 and the base metal to be welded generates optical radiation 3 as well as weld fumes. At that time, if the fume processor 12 is operated, the weld fumes are sucked through the suction hood 10 and the suction tube 11 into the fume processor to be cleaned, and then exhausted to the atmosphere.

In this way, the welding progresses while the arc 2 is emitting optical radiation 3, and when the optical radiation falls on a light receiving surface of the P. C. E. 4 disposed on the front end surface of the suction hood 10, that is, on the light receiving surface of the P. C. E. 4 disposed at the forward side with respect to the direction of progress of the welding, the resistance value of the P. C. E. 4 changes, resulting in a variation of the current flowing therethrough. This current is amplified by the amplifier 6*a*, and when the amplified current has reached a predetermined value, the relay switch 6*b* is actuated, resulting in operation of the D. C. motor associated with the truck driving device 9, so that the truck 13 travels forward.

Then, since the travelling speed of the truck 13 is preset at a value somewhat faster than the speed of progress of the welding, the truck 13 can advance a little faster than the progress of welding, and therefore, as the truck 13 advances, the optical radiation 3 of the arc 2 entering the field of view of said P. C. E. 4 would gradually be reduced. Consequently, the resistance value of this P. C. E. 4 would rise successively, resulting in a reduction of the current flowing therethrough. Eventually, when the current has been reduced to a value lower than a predetermined value, the relay switch 6*b* would be switched off, so that the truck driving device 9 is turned off to stop the truck 13, and as a result, the suction hood 10 is also stopped and waiting for a further progress of the welding.

As the welding progresses further and the optical radiation 3 emitted from the arc 2 enters in the field of view of the P. C. E. 4 disposed on the front end surface of the suction hood 10, the suction hood 10 again start to advance jointly with the truck 13 until the P. C. E. 4 on the front end surface of the suction hood 10 does not receive the optical radiation 3 from the arc 2, and thereafter these start-stop operations are intermittently repeated. Therefore, the suction hood 10 can be always positioned right above the weld metal zone, whereby the weld fume produced upon arc welding can be surely and continuously exhausted.

In the case where the welding progresses in the opposite direction to the above-described direction of progress of the welding, if the polarity of the D. C. power supply 8 is reversed, then as the welding progresses, the optical radiation 3 emitted from the welding are 2 is detected by the P. C. E. 4 mounted on the rear end surface of the suction hood 10, and in response to the detection signal derived from the P. C. E. 4, the truck driving device 9 is actuated so that the truck 13 may advance in the same direction as the direction of progress of the welding. Thereafter, the suction hood 10 is subjected to intermittent movement just as in the aforementioned case, and the optimum control is thereby effected for the suction hood 10.

Alternatively, it is also possible that separate amplifiers are connected respectively to the P. C. E.'s. at the front and rear ends, the respective outputs from these amplifiers being applied to the input of controller 6 and including gate circuits, comparator circuits, etc. so that when the output of the front end P. C. E. 4 has reached a predetermined value, the suction hood 10 may start advancing, and when the output of the rear end P. C. E. 4 has reached said predetermined value, a reversing switch for reversing the direction of travel may be transferred to make the suction hood 10 travel in the opposite direction.

Furthermore, in the case where the direction of progress of welding is limited to one direction, modification could be made to the above-described embodiment such that the P. C. E. 4 is disposed only on one end surface of the suction hood 10 and the direction of rotation in the truck driving device 9 is limited to only one direction.

Figure 5:
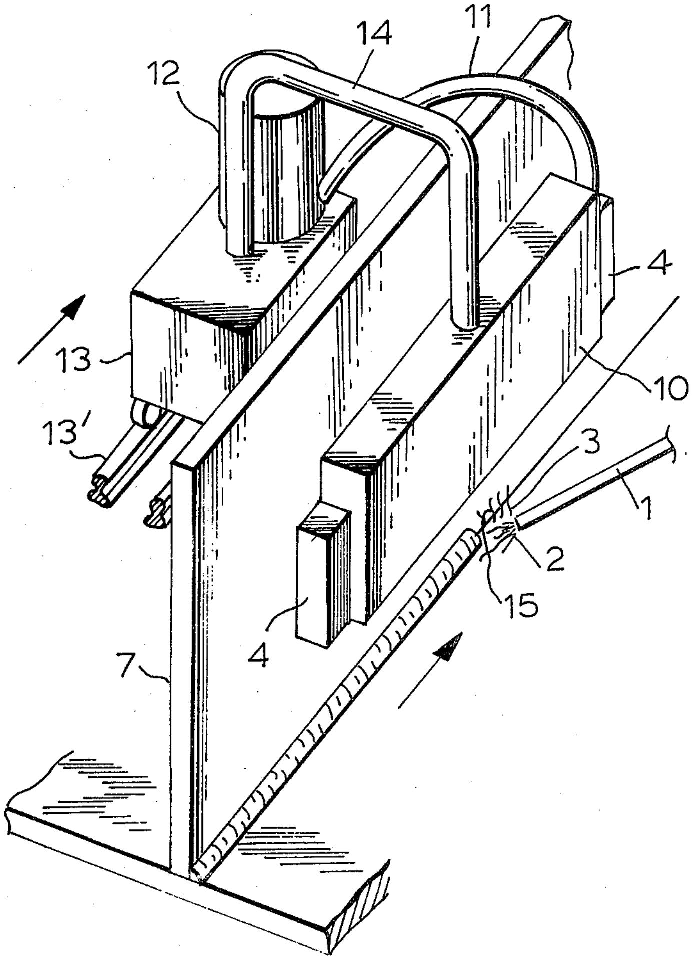

Referring now to FIG. 5, the apparatus for exhausting a weld fume according to the present invention is illustrated in a perspective view as applied to fillet welding. In this case, the connecting pipe 14 connecting the truck 13 and the suction hood 10 is disposed so as to stride over a steel wall plate 7, and hence the steel wall plate 7 intervenes between the truck 13 and the suction hood 10. In this case also, substantially the same effects and advantages as the case of the above-described butt welding can be obtained. It is to be noted that in the case of the fillet welding shown in FIG. 5, the configurations of the connecting pipe 14 and the suction hood 10 and the positional relationship between the truck 13 and these members are determined so that desired space distances may be established between the suction hood 10 and the steel wall plate 7 and between the suction hood 10 and the weld metal zone.

In the above-described respective preferred embodiments, as the photoelectric detector means the P. C. E. (making use of, for example, CdS) whose electric resistance may vary in proportion to the intensity of illumination at the detector means, has been described. However, as the photoelectric means, besides any photovoltaic element (for example, photovoltaic cell) which generates an electromotive force as a function of the intensity of illumination, could be used.

More particularly, in apparatus similar to the above-described respective embodiments, the modification could be made in such a manner that the voltages generated by the front and rear photovoltaic cells are compared to each other and the position control for the suction hood 10 is effected depending upon the result of the comparison; or if the voltage generated by the front photovoltaic cell becomes, for example, higher than that generated by the rear one and higher than a preset value, then a relay switch is transferred so as to move the truck 13 forward and thus the suction hood 10 moves forwards, whereas if the voltage generated by the rear photo-voltaic cell becomes higher than that generated by the front one and higher than a preset value, then another relay switch separate from first said relay switch is transferred so as to move the truck backward and thus the suction hood moves backwards. Moreover, as a matter of course, it is possible to modify the above-described apparatus so that the suction hood 10 may be stopped when the arc 2 is located in the vicinity of the center of the suction port 10 and the difference between the voltages generated by the front and rear photo-voltaic cells thereby becomes less than a predetermined value.

In addition, further modification could be made to the abovedescribed embodiments such that the truck driving device 9 may be chopper-controlled by the controller 6 to control the travelling speed of the truck 13 in the optimum mode in response to the voltage generated by the photo-voltaic element.

As described in detail above, in the process for exhausting weld fumes according to the present invention, since optical radiation emitted from a weld metal zone during welding is detected and position control for a weld fume suction hood covering said weld metal zone can be effected in response to the detection signal, the suction hood can be automatically moved to the optimum position in accordance with the progress of the welding, and therefore, there is an advantage that exhaust of weld fumes can be achieved efficiently and continuously.

Moreover, in the apparatus for exhausting weld fumes according to the present invention, since a truck supporting a suction hood for weld fumes is constructed so that it may be moved in the direction of progress of welding by a truck driving device, and since a fume processor is connected to the suction hood, the overall apparatus can be made small in size and light in weight, and therefore, there is an advantage that the aforementioned process according to the present invention can be practiced even within narrow compartments. In addition, since photoelectric elements for detecting optical radiation emitted from a weld metal zone are provided on the suction hood, and since the apparatus is provided with a truck start-stop controller responsive to a detection signal from the photoelectric element for controlling the truck driving device, there is an advantage that weld fumes can be continuously and reliably exhausted.

Now description will be made on a further improved process according to the present invention which is especially suitably applied to fillet welding and a practical structure for practicing the process.

Figure 6:
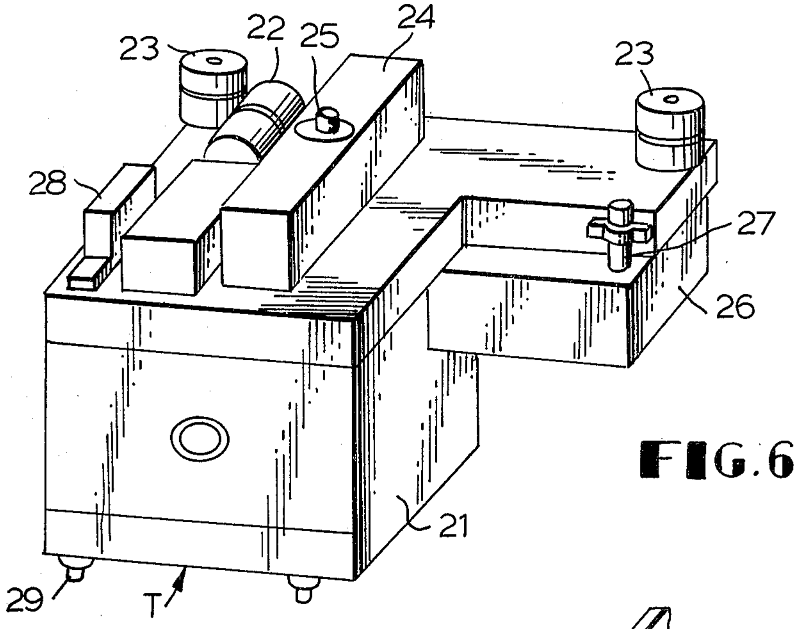
FIGS. 6 to 9 show an improved structure of an apparatus for exhausting weld fumes according to another preferred embodiment of the present invention which is especially suitable for use in fillet welding, FIG. 6 being a perspective view of the apparatus, FIG. 7 being a perspective view of the same apparatus in an operating state, FIG. 8 being a transverse cross-section view of the same also in an operating state, and FIGS. 9a–9d being schematic views showing successive steps in the operation of the same apparatus.
Figure 7:
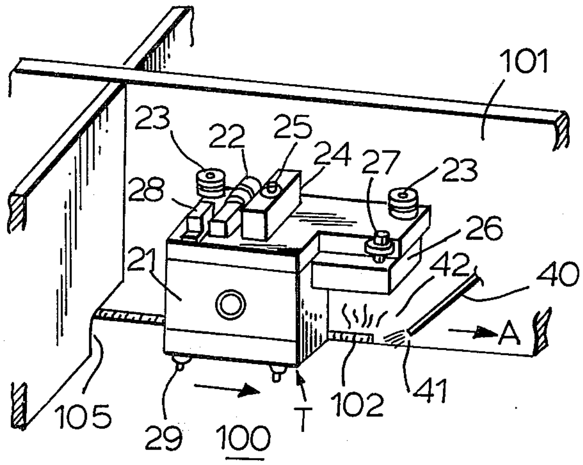
Figure 8:
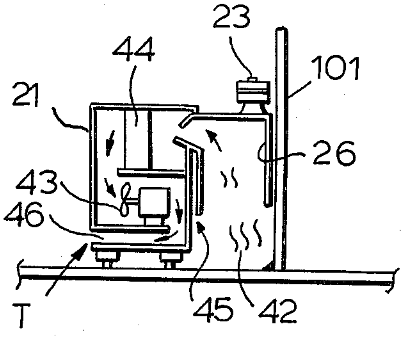

In a fillet weld metal zone along an intersection between a floor plate 100 of base metal consisting of a magnetic material such as steel and a wall plate 101 made of the same material as shown in FIGS. 1 and 2, a truck T associated with casters 29 is disposed on the floor plate 100 so that it can travel freely as shown in FIGS. 6, 7 and 8.

On this truck T is provided a weld fume processor 21, and furthermore a weld fume suction hood 26 is formed integrally with this truck T. In addition, the weld fume processor 21 is provided with a fan 43 for sucking weld fumes 42 produced at a fillet weld metal zone, and a filter-absorber 44 for collecting and removing harmful substance components in the weld fumes 42 sucked in by the fan 43; fan 43 and filter-absorber 44 are contained within a case 45.

The fan 43 is connected to a power supply via a timer not shown, and is adapted to be driven and stopped under the control of the truck start-stop controller 28 as will be described later. In addition, downstream of the fan 43 within the case 45 is formed an exhaust port 46 for exhausting the weld fumes as a clean gas after having its harmful substance contents removed. Therefore, the weld fumes 42 are led to the fume processor 21 through the suction hood 26, and after the fumes have been cleaned therein, they are discharged from the exhaust port 46.

As shown in FIGS. 6, 7 and 8, magnet rollers 23 made of permanent magnets are rotatably mounted on the front and rear end portions, respectively, of the suction hoods 26, and the respective magnet rollers 23 are adapted to be guided along the wall plate 101 of the base metal to be welded consisting of a magnetic material as attracted thereby. These magnet rollers 23 are respectively connected to a truck driving device 22 such as a geared motor through a transmission mechanism not shown; the respective magnet rollers 23 can thereby be rotationally driven in a synchronized relationship to each other, and as a result, the truck T can be driven so as to travel jointly with the suction hood 26 along the welding line 102.

During fillet welding, a welding arc 41 and weld fumes 42 are produced between an electrode 40 and a base metal to be welded, and for the purpose of detecting optical radiation emitted from the welding arc 41 at the fillet weld metal zone during the welding, a photoelectric element 27 is disposed in the vicinity of a bottom aperture in the front portion of the suction hood 26. This photoelectric element 27 is disposed with its light receiving surface directed towards the bottom aperture of the suction hood 26 or in the direction somewhat inclined inwards, and it is connected to the truck start-stop controller 28 through a cable not shown.

This controller 28 is provided with an amplifier and a switch for a truck driving device, both not shown, and this switch is connected to a D. C. power supply such as a battery through the truck driving device 22, so that in response to the switching action of this switch in the controller 28, the truck driving device 22 can be started and stopped, and the truck T is adapted to start or stop travelling in accordance with the start or stop operation of the truck driving device 22.

Furthermore, as described previously, the controller 28 can also achieve drive control for the fan 43. In addition, reference numeral 24 designates a speed control device in which the travelling speed of the truck T can be preset at the optimum value so that a desired weld leg length may be obtained by manipulating a speed setting dial 25. The aforementioned photoelectric element 27 is an element which can detect optical radiation and can generate a voltage corresponding to the intensity of illumination of the optical radiation at the element as a detection signal, and a photo cell or a photo-conductive element such as CdS whose internal resistance varies in proportion to the intensity of illumination can be used, for example, as the photoelectric element 27.

Since the apparatus for exhausting weld fumes in fillet welding according to the present invention is constructed as described above, in order to exhaust weld fumes 42 produced during filled welding, the truck T is first disposed on the floor plate 100 of the base metal to be welded in such manner that the suction hood 26 for a weld fume may be positioned above the weld metal zone as spaced therefrom and also that the magnet rollers 23 may be attracted onto the wall plate 101 of the same base metal to be welded.

Once the truck T and the magnet rollers 23 have been disposed as described above, the fillet welding can be progressed along the weld line 102 in the direction of welding A while a welding arc 41 and weld fumes 42 are being produced between the electrode 10 and the base metal to be welded.

Subsequently, when the optical radiation emitted from the welding arc 41 accompanying the welding is detected by the photoelectric element 27 such as, for example, a photo cell, a voltage corresponding to the intensity of illumination at the same element is generated as a detection signal. Then, after this voltage signal has been appropriately amplified by an amplifier in the truck start-stop controller 28, it acutuates the switch in the controller 28 so that a power supply, not shown, may be connected to the truck driving device 22 and the fan 43 in the weld fume processor 21, and the truck driving device 22 and the fan 43 are thereby started into operation.

When the truck driving device 22 is started in the abovedescribed manner, the respective magnet rollers 23 which are adapted to be driven by the truck driving device 22 into synchronized rotations, are also started, and therefore, the truck T starts travelling along the direction of progress of the welding A.

Moreover, since the interior of the case 45 has a negative air pressure due to the operation of the fan 43, the weld fumes 42 produced at the fillet weld metal zone are led through the suction hood 26 into the filter-absorber 44 where the harmful substance contents are collected and removed, and thereafter the fumes are discharged from the exhaust port 46 as a clean gas. Although the case 45 is raised in temperature during the above-described operation due to the heat of the welding arc and in some case there is a fear that the case 45 may be deformed and damaged, the back wall surface of the case 45 is being cooled continuously by the exhaust gas as shown in FIG. 8, and hence, the fear of deformation and damage of the case 45 can be obviated.

Since the travelling speed of the truck T which is driven by the truck driving device 22 by the intermediary of the rotational drive by the magnet rollers 23 is preset at the optimum value by the speed setting dial 25 so as to meet the various welding conditions such as a weld leg length, an available electrode 40, etc., the suction hood 26 can be always positioned above the fillet weld zone, and thereby the weld fumes 42 can be exhausted reliably, continuously and efficiently.

If the travelling speed of the truck T is preset at a value somewhat faster than the speed of progress of the welding, then the truck T is subjected to an intermittent peristaltic movement, and thereby the positioning of the suction hood 26 can be controlled so as to be held at the optimum. On the other hand, if the travelling speed of the truck T is preset at a value approximately equal to the speed of progress of the welding, then suction hood 26 can be controlled to be placed at the optimum position while the truck T is subjected to a substantially continuous movement.

When the welding has terminated, since the optical radiation emitted from the welding arc 41 is also extinguished following the termination, the voltage generated by the photoelectric element 27 is lowered, and due to a switching action in the controller 28 in accordance with the fall in voltage, the truck driving device 22 as well as the fan 43 are stopped.

It is to be noted that the fan 43 is adapted to be stopped with a delay of a predetermined duration after the disappearance of the signal from the photoelectric element 27 due to the action of a timer not shown. Such a measure is taken since weld fumes 42 would remain to a certain extent even after termination of the welding, and the remaining weld fumes 42 should be efficiently exhausted.

In addition, since the magnet rollers 23 are mounted on the front and rear end portions, respectively, of the suction hood 26, even in the case where the wall plates 101 surround the compartment along its four sides, the truck T can continuously travel along the respective wall plates 101.

Figure 9A:
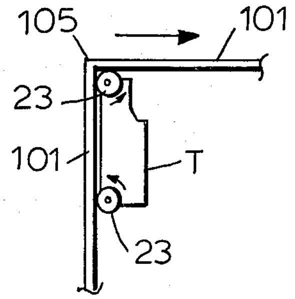
Figure 9B:
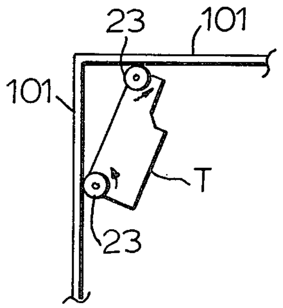
Figure 9C:
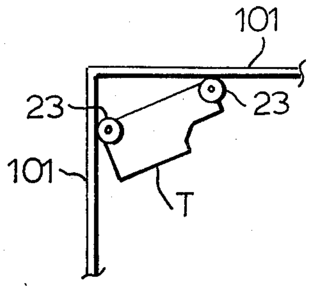
Figure 9D:
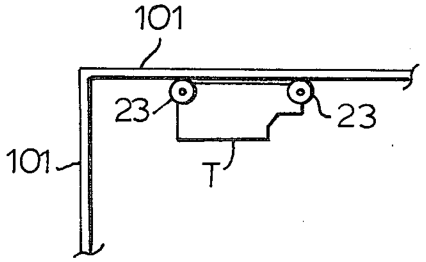

More particularly, in the case where the welding is commenced from a corner 105 as shown in FIG. 9*a*, the truck T is set as illustrated in FIG. 9*a*, thereafter simultaneously with the commencement of the welding the travelling system is driven as described above, and as a result when the front magnet roller 23 strikes against the wall plate 101, these magnet rollers 23 will roll along the intersecting wall plates 101 as shown in FIGS. 9*b*–9*d*, whereby the orientation of the truck T can be turned. Thereafter, since the truck T travels continuously along the surrounding wall plates 101, even though the direction of welding is changed midway, there is no need for a welder to turn the orientation of the truck T.

As fully described above, in the apparatus for exhausting weld fumes to be used in fillet welding according to the present invention, since the truck disposed on the floor plate of the base metal to be welded consisting of a magnetic material so as to be able to travel along the floor plate is provided with a weld fume processor, a suction hood for weld fumes formed integrally with the truck, magnet rollers mounted on said suction hood and adapted to be guided and driven along the wall plate of said base metal to be welded as attracted onto said wall plate, and a truck start-stop controller which can control the truck driving device for driving said truck in response to a detection signal derived from a photoelectric element mounted on the suction hood for the purpose of detecting optical radiation emitted from the fillet weld metal zone during the welding, the following effects and advantages can be obtained:

(1) As the suction hood for weld fumes is controlled in position so as to be always positioned right above the fillet weld metal zone, the exhaust of the weld fumes can be practiced in an effective manner.

(2) Even in the case of continuous welding along four sides of a compartment, once the truck is properly set in the begining, then it is possible to make the truck travel continuously and automatically, and even if the direction of welding is changed midway, there is no need to reset the truck T.

(3) If the travelling speed of the subject apparatus is set at the optimum welding speed, then the apparatus serves as a pace maker, and thereby reliable welding can be practiced.

(4) Since the apparatus has an internal structure that is small in size and light in weight, transportation of the apparatus is easy, the period of preparation for work can be shortened, and thereby the working efficiency can be greatly improved.

(5) As the truck driving device stops automatically when the welding is completed or interrupted, a welder can devote himself to the welding work, and there is no wasteful consumption of power.

What is claimed is:

1. A process for exhausting weld fumes, wherein during arc welding, optical radiation emitted from an arc is detected by photelectric means provided on a suction hood, said suction hood is made to travel along a weld line in response to an electric detection signal from said photelectric means which is related to an intensity of illumination of said optical radiation at said suction hood so that said hood may be maintained within a predetermined range of travel, and thereby the weld fumes are exhausted through said suction hood while said suction hood is always covering a weld metal zone.

2. A process for exhausting weld fumes as claimed in claim 1, wherein a suction hood which is adapted to travel when said electric detection signal has reached a predetermined value, is started for travelling in the direction of the progress of arc welding at a predetermined speed higher than the speed of the progress of arc welding, and when said electric detection signal has become lower than said predetermined value, the travelling of said suction hood is stopped, and wherein said starting and stopping operations are repeated.

3. A process for exhausting weld fumes as claimed in claim 2, wherein when said electric detection signal has reached a predetermined value, said travelling of said suction hood is started, whereas when said electric detection signal has become lower than another predetermined value that is smaller than said first predetermined value, said travelling of said suction hood is stopped.

4. A process for exhausting weld fumes as claimed in claim 2, wherein said photoelectric means includes two photoelectric detectors disposed at the front end portion and the rear end portion, respectively, of said suction hood, and wherein during the period when said arc welding progresses in one direction, said suction hood is subjected to peristaltic movement in the direction of progress of said arc welding in response to an electric detection signal from one of said photoelectric detectors, whereas during the period when said arc welding progresses in the opposite direction, said suction hood is subjected to peristaltic movement in the opposite direction to the progress of said arc welding in repsonse to another electric detection signal from the other of said photoelectric detectors.

5. A process for exhausting weld fumes as claimed in claim 2, wherein said photoelectric means includes two photoelectric detectors disposed at the front end portion and the rear end portion, respectively, of said suction hood, and wherein an electric detection signal from one of said photoelectric detectors is compared with another electric detection signal from the other of said photoelectric detectors, and when the difference between said respective electric detection signals has exceeded a predetermined set value, travelling of said suction hood in the direction towards the end portion of the suction hood where the photoelectric detector generating a larger electric detection signal is mounted is started, whereas when the difference between said respective electric detection signals has become lower than another predetermined set value that is lower then said first predetermined set value, said travelling of said suction hood is stopped.

6. A process for exhausting weld fumes as claimed in claim 2, wherein said photoelectric means includes two photoelectric detectors disposed at the front end portion and the rear end portion, respectively, of said suction hood, and wherein when the electric detection signal from said phtotelectric detector at the front end portion has reached a predetermined value, travelling of said suction hood is started, whereas when the electric detection signal from said photoelectric detector at the rear end portion has reached a predetermined value, said travelling of said suction hood is stopped.

7. A process for exhausting weld fumes as claimed in claim 2, wherein so long as said electric detection signal is higher than a predetermined value, said suction hood is made to travel along a weld line at a predetermined welding speed.

8. An apparatus for exhausting weld fumes comprising a truck capable of travelling along the direction of progress of welding, driving means for making said truck travel, a suction hood supported from said truck, a fume processor connected to said suction hood, photoelectric means mounted on said suction hood for detecting optical radiation emitted from a welding arc, and control means interposed between said photoelectric means and said driving means for controlling starting and stopping of said travelling of said truck.

9. An apparatus for exhausting weld fumes as claimed in claim 8, wherein said truck is placed via rollers on a floor plate of base metal so as to be free to travel along said floor plate, and includes magnet rollers made of magnetic material which can roll along a wall plate of said base metal intersecting with said floor plate as being magnetically attracted by said wall plate, and said suction hood can be made to travel by rotationally driving at least one of said magnet rollers.

10. An apparatus for exhausting weld fumes as claimed in claim 9, wherein said control means includes a switch which is actuated when an electric detection signal from said photoelectric means that is related to the intensity of illumination of the optical radiation emitted from said welding arc has exceeded a predetermined value, and in response to said actuation of said switch, said magnet rollers are rotationally driven at a predetermined angular velocity so that said suction hood may be driven to travel along a weld line at a predetermined speed.

* * * * *